Figure 1:
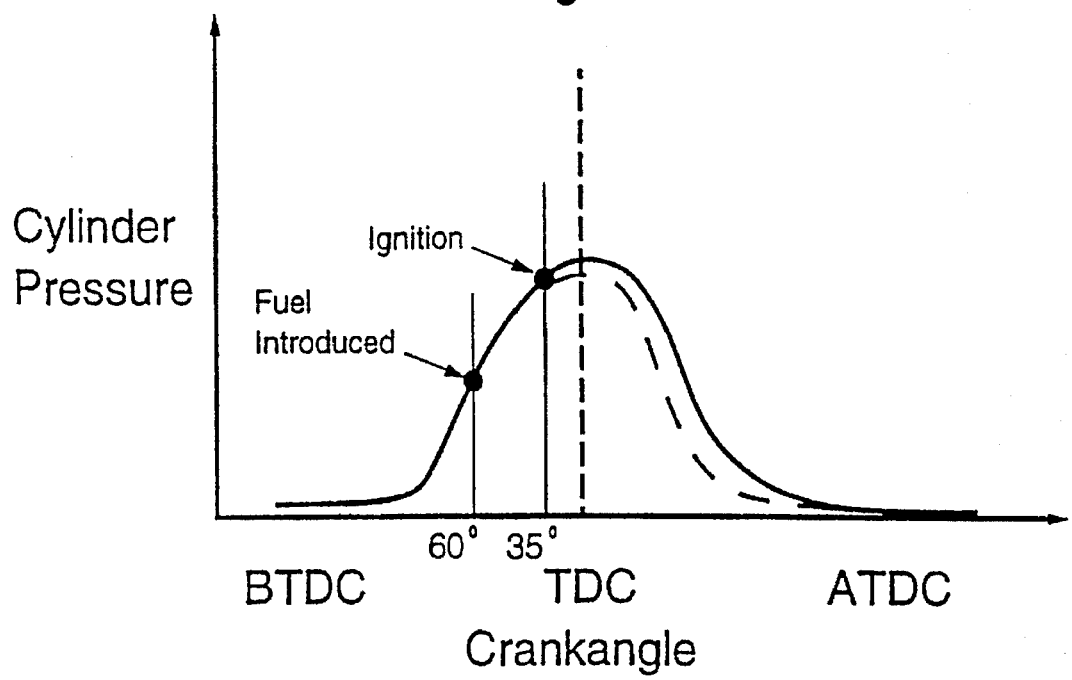

United States Patent [19]

Worth et al.

[11] Patent Number: 5,655,365
[45] Date of Patent: Aug. 12, 1997

[54] METHOD OF OPERATING AN INTERNAL COMBUSTION ENGINE

[75] Inventors: David Richard Worth, Shenton Park; Stephen James Watson, Greenwood; Jorge Manuel Pereira Da Silva, North Beach, all of Australia

[73] Assignee: Orbital Engine Company (Australia) Pty. Limited, Balcatta, Australia

[21] Appl. No.: 446,739

[22] PCT Filed: Jan. 24, 1994

[86] PCT No.: PCT/AU94/00028

§ 371 Date: Jun. 6, 1995

§ 102(e) Date: Jun. 6, 1995

[87] PCT Pub. No.: WO94/17229

PCT Pub. Date: Aug. 4, 1994

[30] Foreign Application Priority Data

Jan. 25, 1993 [AU] Australia ................. PL6972

[51] Int. Cl.⁶ ................. F01N 3/36; F01N 3/38; F02D 41/06; F02P 5/15
[52] U.S. Cl. ................. 60/285; 123/73 C; 123/305
[58] Field of Search ................. 123/73 C, 295, 123/305, 425, 435, 676; 60/274, 276, 284, 285

[56] References Cited

U.S. PATENT DOCUMENTS

| | | | |
|---|---|---|---|
| 3,799,134 | 3/1974 | Griese | 60/284 X |
| 3,813,877 | 6/1974 | Hunt | 60/284 |
| 3,949,551 | 4/1976 | Eichler et al. | 60/285 X |
| 4,023,359 | 5/1977 | Masaki et al. | 60/277 |
| 4,209,981 | 7/1980 | Miyamori et al. | 60/274 |
| 4,276,745 | 7/1981 | Takada et al. | 60/276 |
| 4,370,855 | 2/1983 | Tuggle | 123/41.65 X |
| 5,050,551 | 9/1991 | Morikawa | 123/73 C X |
| 5,211,011 | 5/1993 | Nishikawa et al. | 60/284 |
| 5,303,168 | 4/1994 | Cullen et al. | 123/425 X |
| 5,315,823 | 5/1994 | Nishikawa et al. | 60/286 |

OTHER PUBLICATIONS

Patent Abstracts of Japan, M-110, p. 1325, JP,A,4-183922, Jun. 30, 1992.
Patent Abstracts of Japan, M-117, p. 1167, JP,A,3-164549, Jul. 16, 1991.
Patent Abstracts of Japan, M-138, p. 949, JP,A,2-5740, Jan. 10, 1990.
Patent Abstracts of Japan, M-131, p. 588, JP,A,61-283735, Dec. 13, 1986.

*Primary Examiner*—Tony M. Argenbright
*Attorney, Agent, or Firm*—Nikaido, Marmelstein, Murray & Oram LLP

[57] ABSTRACT

A method of operating an internal combustion engine comprising retarding the ignition of a gas/fuel mixture within at least one cylinder of the engine to after top dead center (ATDC) in respect of the combustion cycle of said at least one cylinder of the engine. While the ignition is so retarded, the fuelling rate of said at least one cylinder is increased to a level higher than that required when the engine is operating normally.

18 Claims, 2 Drawing Sheets

METHOD OF OPERATING AN INTERNAL COMBUSTION ENGINE

This invention relates to a method of operating an internal combustion engine in order to produce high exhaust gas temperatures and is particularly useful for internal combustion engines incorporating a catalytic treatment means in the exhaust system for treatment of the exhaust gases to reduce undesirable contaminants therein.

Although catalytic treatment of gases to reduce the level of undesirable emissions therein is effective, the catalytic material or catalyst of the catalytic treatment means has a minimum operating temperature (generally referred to as the "light off" temperature and conventionally taken as the temperature at which the catalyst is 50% efficient), and is relatively ineffective until this required operating temperature has been reached, Thus, during such periods, increased levels of undesirable emissions are likely to issue from the exhaust system. Normally, at engine startup, particularly after a period of non-operation, the catalytic material is below its light-off temperature and in order to reduce the time, and therefore the amount of emissions output until light-off of the catalyst, it may be desirable to raise the temperature of the exhaust gases delivered from the combustion chamber(s) of the engine to the exhaust system. However, at startup the engine typically will operate at a relatively low load and speed, such as is termed "engine idle", and therefore the amount of fuel being delivered to the engine is comparatively small and hence, only a relatively small amount of heat is available for raising the temperature of the exhaust gases and hence the temperature of the catalytic material to its "light-off" temperature.

Further, after catalyst light-off, when the engine is allowed to idle or operate at a low load condition for a significant period of time, particularly in low ambient temperature conditions, the exhaust gas temperature may drop to a value that is insufficient to maintain the catalytic material in the light-off condition and thus it will become ineffective in the treatment of contaminants and undesirable emissions in the exhaust gas.

There have been proposals to heat the catalytic material by means of an afterburner device placed upstream of the catalytic treatment means. In such an arrangement, the afterburner device ignites the remaining combustible mixture within the exhaust gases to raise the temperature of the catalytic material. This arrangement does however add significantly to the cost and complexity of the engine installation.

It is therefore the object of the present invention to provide a method of operating an internal combustion engine which will assist in maintaining high exhaust gas temperatures and thus, where appropriate, achieve rapid light-off of the catalytic material in the exhaust system and maintain such a light-off condition whilst the engine is operating.

With this object in view, there is provided a method of operating an internal combustion engine comprising retarding the ignition of a gas/fuel mixture within at least one cylinder of the engine to after top dead centre (ATDC) in respect of the combustion cycle of said at least one cylinder of the engine. While said ignition is so retarded, the fuelling rate of said at least one cylinder is preferably increased to a level higher than that required when the engine is operating normally.

Conveniently, ignition can be retarded up to about −30° BTDC (i.e 30° ATDC) and is preferably of the order of −20° BTDC (i.e 20° ATDC). The ignition retardation may alternatively be variable, preferably between 15° ATDC to 30° ATDC in the case of a multi cylinder engine such as a three cylinder engine. Preferably, the fuelling rate (measured in mg/cylinder/cycle) is greater than 50% of the fuelling rate at maximum load, and more preferably is up to about 80% of the fuelling rate at maximum load. However, if desired, the fuelling rate can be in excess of 100% of the fuelling rate at maximum engine load. However, the selected fuelling rate is conveniently the minimum rate which will ensure that the desired exhaust gas temperature is achieved. The fuel may be introduced to the combustion chamber before top dead centre (BTDC) and most preferably at 60° to 80° BTDC in the case of a direct injected engine. It is however also envisaged that the fuel be introduced to the cylinder after top dead centre (ATDC) under certain conditions or situations.

This method may conveniently be used in an engine including a catalytic treatment means provided in the exhaust system of the engine. A flame arrester may be placed between an exhaust port of the engine and the catalytic treatment means. This prevents the catalytic material held within the catalytic treatment means from directly contacting any flame that may arise as a resulting of any still burning exhaust gases. Additional air may be introduced upstream of the catalytic treatment means. This additional air helps to promote the catalytic oxidation of the exhaust gases.

The method can be operated during cold start of the engine. Alternatively or in addition, the method is operated when the temperature of the catalytic material is sensed or determined to be below a required operating temperature.

The engine may conveniently be a two stroke internal combustion engine. The engine may preferably have piston operated exhaust ports.

In the case of an air control system as disclosed in our copending Australian Patent Application No. 51065/90, the contents of which are hereby incorporated by reference, the by-pass air control valve under the control of the engine management system may be fully opened whilst the main manually controlled throttle valve remains in the closed position.

The invention will be more readily understood from the following description of an exemplary embodiment of the method of operating an internal combustion engine according to the present invention as shown in the accompanying drawings.

Figure 2:
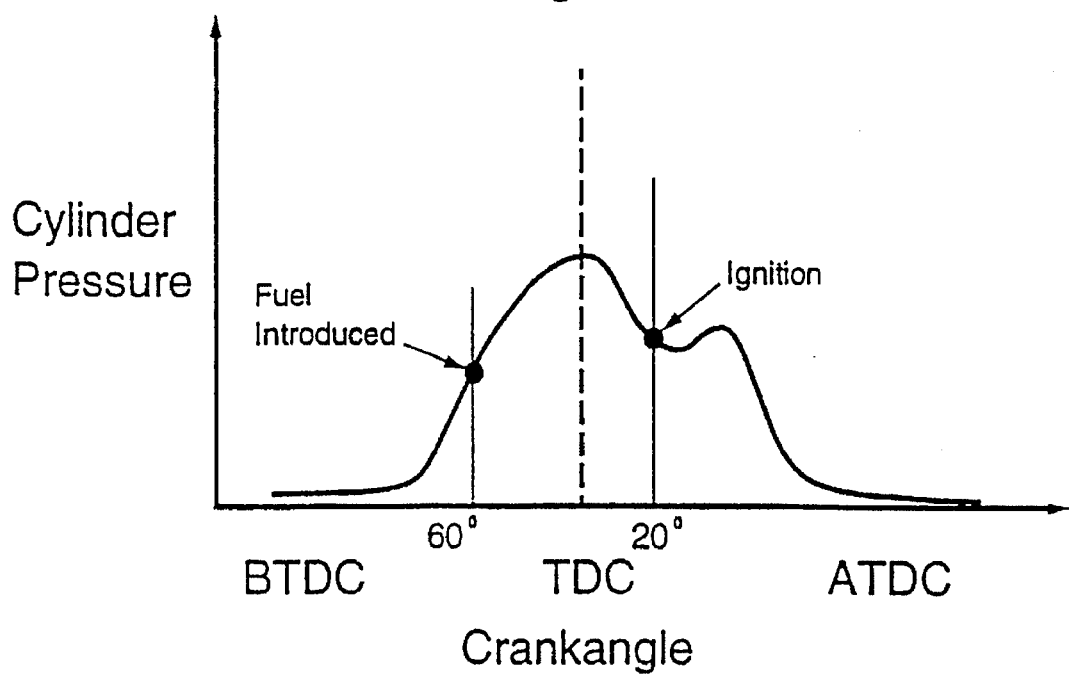
Figure 3:
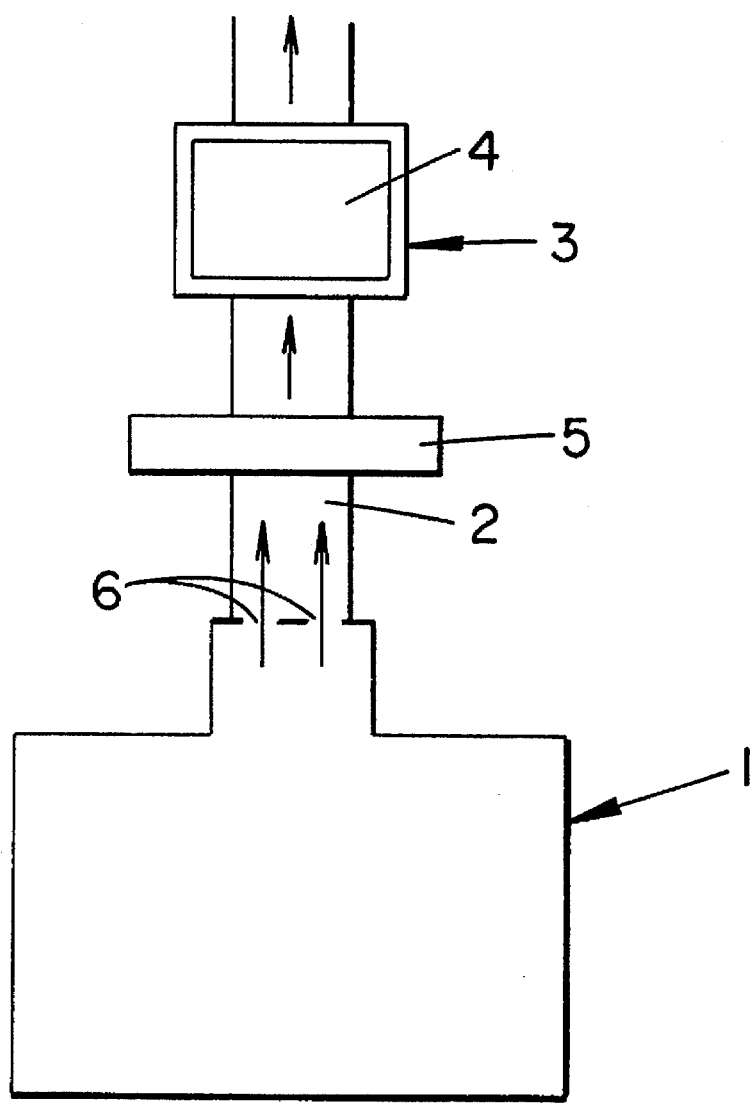

In the drawings:

FIG. 1 is a graph showing the cylinder pressure-crankangle characteristics for a typical direct injected two-stroke internal combustion engine; and FIG. 2 is a graph showing the cylinder pressure-crankangle characteristics for a direct injected two-stroke internal combustion engine operated according to the method of the present invention, and FIG. 3 is a schematic view of an internal combustion engine and associated engine exhaust system.

The method according to the invention can be used on a two stroke internal combustion engine having piston controlled exhaust ports and the invention will be described in relation to this exemplary application.

Referring initially to FIG. 1, in a typical direct injected two-stroke internal combustion engine, the fuel is introduced to the cylinder at approximately 60° before top dead centre (BTDC) with ignition within the cylinder occurring prior to top dead centre at approximately 35° BTDC. The solid curve of the graph of FIG. 1 shows the cylinder pressure crankangle characteristics where ignition has occurred. The dashed curve shows the situation where ignition does not occur.

In the method according to the invention and as shown in an exemplary embodiment in FIG. 2, while the fuel is introduced to the cylinder at between 60° and 80° BTDC, the ignition within the cylinder is retarded and occurs at up to about −30° BTDC, ie. 30° after top dead centre (ATDC). The curve of the graph of FIG. 2 shows the cylinder pressure crankangle characteristics where the fuel is introduced to the cylinder at 60° BTDC and ignition thereof occurs at −20° BTDC.

The fuelling rate can also be varied such that it is greater than 50% of the fuelling rate at maximum load, and preferably up to about 80% of the fuelling rate at maximum load. FIG. 3 shows an internal combustion engine 1 with an associated exhaust system 2 connecting the engine exhaust ports 6 to a catalytic treatment means 3. Catalytic material 4 is supported within the catalytic treatment means 3. A flame arrester 5 is located upstream of the catalytic treatment means 3 between the exhaust ports 6 and the treatment means 3.

The method according to the present invention can be varied depending on the number of cylinders of the engine. For example, in a three cylinder engine where only one or two cylinders are to be operated in accordance with said method, it is preferred that the fuelling rate thereto be kept constant and that the ignition be retarded a fixed amount, typically about 20° ATDC, for the cylinder(s) operating under ignition retard/high fuelling rate conditions. Under such operation, the other cylinder(s) still operates under normal conditions and the operation thereof may be such as to compensate for the temporary loss in torque while the other cylinder(s) operate(s) under said conditions. The cylinder(s) operating under normal conditions may also regulate the engine idle speed.

By comparison, in a three cylinder engine where all cylinders are operating in accordance with said method it is preferred that a high fuelling rate be fixed for all of the cylinders and that all of the cylinders operate with retarded ignition. The degree of retardation for each of the cylinders may conveniently be the same during at least one combustion cycle of one light-off period.

Further, it is preferable that the degree of ignition retard of the cylinders during the one light-off period be altered from cycle to cycle, typically between 15° ATDC to 30° ATDC, to control the engine idle speed. However, it is also envisaged that the degree of ignition retard could alternatively or in addition be controlled to differ between respective cylinders during the one light-off period.

By virtue primarily of the retarded ignition and also to a lesser extent the high fuelling rate, the overall thermal efficiency (i.e the efficiency of conversion of energy provided by combustion of the fuel into useful work) is quite low. Thus there is a high level of thermal energy available to heat the catalytic treatment means provided for treatment of the exhaust gases. In addition, extra heat is released to the engine coolant thereby rapidly increasing the coolant temperature which results in a lower engine output of HC emissions thereby reducing the dependence on the catalytic treatment means to maintain the required HC emissions level.

The combustion preferably occurs under rich conditions with the overall air/fuel ratio being close to the stoichiometric ratio. Because of the inefficient combustion conditions, gases with lower oxidation temperatures such as H and CO will be produced. These gases can react with the catalytic material to increase its temperature and therefore aid the catalytic material in achieving its light-off temperature.

If desired, additional oxygen containing gas, such as air, may be introduced upstream of the catalytic treatment means provided in the exhaust system of the engine, for example, by use of an air pump, thus ensuring the introduction of excess oxygen to the exhaust system enabling catalytic conversion of any contaminants in the exhaust gas. In many cases, it will be desirable that the throttle or air control means for the air supply to the combustion chamber with retarded ignition be set at a "wide open" or near "wide open" value such as to maximise air supply to that combustion chamber, thus allowing higher fuelling rates to be used. However, in the case that the air control system serves more than one cylinder, then the air flow rate must be established such that the combustion efficiency of the combustion chamber(s) without retarded ignition is not adversely affected.

It has been found that maintaining the retarded ignition and high fuelling rate conditions for a "light-off" period only of the order of 30 seconds from engine startup is sufficient to bring the catalytic treatment means up to temperature to establish light-off of the catalytic material in the treatment means. In some cases, the level of thermal energy available is even greater thus shortening the above period to 5 seconds or so. Furthermore, and particularly in the case of two stroke engines, there may be insufficient time between the commencement of ignition and the opening of the exhaust port for all of the fuel to be combusted within the combustion chamber. Thus, combustion may continue as the combustion gases flow from the combustion chamber into the exhaust system. In such a case, it may be beneficial to place a flameshield upstream of the catalytic treatment means to protect it from contact with any flames. Where necessary, and as alluded to hereinbefore, excess air may be introduced to the exhaust system to promote the catalytic oxidation of the exhaust gases.

Further, it is to be understood that the high degree of retarding of the ignition resulting in the relatively short period between ignition and exhaust and the high fuelling rate may only produce a relatively low torque output. Accordingly, at engine idle, the high fuelling rate does not result in the engine revving at a speed significantly different to the normal engine idle speed. In this regard, it may be preferable that in a multi-cylinder engine, only one or some of the cylinders are subjected to the highly retarded ignition and high fuelling rate thereby enabling the remaining cylinder(s) to provide the necessary control of engine idle speed as aluded to hereinbefore.

It may be advantageous to "rotate" the cylinders such that each cylinder sequentially operates under the retarded ignition and high fuelling rate conditions. This rotation between cylinders may occur within a single light-off period. Alternatively, a different cylinder could be used for consecutive light-off periods. This helps to ensure that each cylinder is subjected to similar temperature and/or carbon formation conditions.

The reduction in the time for the catalyst to reach its light-off temperature achieved by the use of the present invention also enables the catalytic treatment means to be located a greater distance downstream from the engine exhaust port than may otherwise be possible, thereby improving the durability of the catalytic treatment means.

It will be appreciated that where an engine start-up occurs after only a short period of time after shut-down of the engine, the catalytic treatment means may still be at a sufficiently high temperature to immediately light-off on restarting the engine and hence it may be undesirable to further heat the catalytic treatment means by way of the present invention. However, this condition can be determined by appropriate sensing of other engine parameters such as the temperature of the engine in general, cooling water temperature or the temperature of the exhaust system in the vicinity of the catalytic treatment means. Accordingly, sensing of these and/or other engine parameters may be effected and the specific ignition retarding and high fuelling rate conditions only implemented if for example, the sensed temperature condition of the engine and/or exhaust system indicates that the temperature of the catalytic treatment means is at a level which would necessitate assistance in achieving prompt light-off thereof.

Further, where the engine is left idling for a considerable time, and particularly in low ambient temperature conditions, the exhaust system and particularly the catalytic treatment means may fall in temperature to a level at which the catalytic treatment means is below the light-off temperature. Similarly, appropriate sensors can be provided to detect this condition and the engine management system can be arranged to respond to the sensing of such conditions to implement the ignition retard and high fuelling rate conditions to restore or maintain the catalytic treatment means in an acceptable operational condition.

When the appropriate sensor or sensors detect that the engine parameter, for example the exhaust system temperature, is again above the acceptable value, the engine management system may then cease to effect the ignition retard and high fuelling rate conditions and return the cylinder to normal ignition timing and fuelling rates. Where more than one cylinder has been operating with retarded ignition and a high fuelling rate, the return to normal operation is preferably sequential, that is, one cylinder at a time is returned to normal operation and stabilised. This is particularly useful in the case where switching from a high to a lower fuelling rate causes fuel "hangup", that is, retention of fuel within the means used to deliver fuel to the cylinder, in which case the transient response of the engine may not be precise. However, if multiple cylinders are operating with retarded ignition and a high fuelling rate, they may be returned to normal operation simultaneously if there is a substantial increase in operator demand. The method of operating the engine according to the present invention can therefore be initiated, both during cold start of the engine, and when the temperature of catalytic material is sensed or determined to be below the required light-off operating temperature any time during the running of the engine.

While the method of the present invention is particularly suitable for two-stroke engines, preferably those engines which are directly injected, the invention is not limited in its applicability to such engines. In a two-stroke three cylinder 1.2 liter direct injected engine, the anticipated fuel per cycle at normal engine idle is 3 mg/cylinder/cycle whereas when retarded ignition and a high fuelling rate is enabled in accordance with the method of the present invention, the increased fuelling rate may be as high as 18 to 25 mg/cylinder/cycle, i.e 85% to 115% of the fuelling rate at maximum engine load.

In an air-assisted direct injected 2-stroke engine as described, for example, in the applicant's U.S. Pat. No. 4,693,224, it may be convenient to control the speed of the engine by controlling the fuelling rate to the cylinders that are running under normal settings and by controlling the ignition timing of those cylinders that are operating with retarded ignition and increased fuelling rate according to the invention as described herein.

It will be appreciated that the invention is particularly beneficial for bringing the engine catalytic treatment means rapidly to its light-off temperature, and few if any additional components are required. This results in little to no additional costs to the piece price of the engine.

The claims defining the invention are as follows:

1. A method of operating an internal combustion engine comprising retarding the ignition of a gas/fuel mixture within at least one cylinder of the engine to after top dead centre (ATDC) in respect of the combustion cycle of said at least one cylinder of the engine and, while said ignition is so retarded, increasing the fuelling rate of said at least one cylinder to a level higher than that required when the engine is operating normally to thereby assist in increasing the exhaust gas temperature of the engine, the timing of the introduction of fuel into the at least one cylinder being maintained at before top dead centre (BTDC).

2. A method according to claim 1 wherein the fuelling rate is greater than 50% of the fuelling rate at maximum load.

3. A method according to claim 2, wherein the fuelling rate is about 80% of the fuelling rate at maximum load.

4. A method according to claim 1 wherein the fuelling rate is greater than 100% of the fuelling rate at maximum load.

5. A method according claim 1 wherein the ignition is retarded up to about 30° ATDC.

6. A method according to claim 5, wherein the ignition is retarded to about 20° ATDC.

7. A method according to claim 1 wherein the degree of ignition retardation differs between each of the cylinders of a multi-cylinder engine.

8. A method according to claim 7 wherein the degree of ignition retardation differs between 15° ATDC and 30° ATDC.

9. A method according to claim 1 wherein the fuel is introduced at between 60° to 80° BTDC.

10. A method according to claim 1 wherein the engine includes in an exhaust system thereof a catalytic treatment means supporting a catalytic material therein.

11. A method according to claim 10 wherein a flame arrester is inserted between an engine exhaust port and the catalytic treatment means.

12. A method according to claim 10 wherein additional air is introduced upstream of the catalytic treatment means.

13. A method according to claim 10 wherein the engine is operated according to said method during cold start of the engine.

14. A method according to claim 10 wherein the engine is operated according to said method when the temperature of the catalytic material is sensed or determined to be below a required operating temperature.

15. A method according claim 1 wherein the engine has piston controlled exhaust ports.

16. A method according to claim 1 wherein the engine is a two stroke internal combustion engine.

17. A method according to claim 1 wherein the engine is a multi-cylinder engine and at least one of said cylinders is operated without ignition timing retarded to after top dead centre.

18. A method according to claim 1 wherein after a predetermined operating condition has been sensed or determined, said engine reverts back to normal operation.

* * * * *

UNITED STATES PATENT AND TRADEMARK OFFICE
CERTIFICATE OF CORRECTION

PATENT NO. : 5,655,365

DATED : August 12, 1997

INVENTOR(S) : Worth et al.

It is certified that error appears in the above-indentified patent and that said Letters Patent is hereby corrected as shown below:

On the title page,

Item [87], line 1, please delete " WO94/17229 " and insert therefor -- WO94/17293 --

Signed and Sealed this

Fourteenth Day of October, 1997

Attest:

BRUCE LEHMAN

Attesting Officer           Commissioner of Patents and Trademarks